United States Patent [19]
Johnson et al.

[11] Patent Number: 5,707,124
[45] Date of Patent: Jan. 13, 1998

[54] UNIT FOR STORING AND DISPENSING DISKS

[76] Inventors: Scott M. Johnson, 96 Oakley Rd., Belmont, Mass. 02178; James T. Schoonmaker, 208 Allston St. Apt. #5, Brookline, Mass. 02146; Joshua M. Kornfeld, 192 Smith Ridge Rd., Salem, N.Y. 10590

[21] Appl. No.: 621,801

[22] Filed: Mar. 22, 1996

[51] Int. Cl.⁶ ............................................. A47B 81/06
[52] U.S. Cl. ...................... 312/9.48; 312/9.1; 312/9.47; 206/309; 206/308.1; 211/40; 211/41
[58] Field of Search .......................... 312/9.48, 9.51, 312/9.1, 9.47, 350, 301, 308, 309, 311; 206/309, 308.1; 211/40, 41

[56] References Cited

U.S. PATENT DOCUMENTS

| | | |
|---|---|---|
| 3,908,852 | 9/1975 | Ricobene et al. |
| 4,702,369 | 10/1987 | Philosophe . |
| 4,707,247 | 11/1987 | Savoy . |
| 4,807,749 | 2/1989 | Ackeret ............................ 206/309 X |
| 4,932,522 | 6/1990 | Milovich ............................ 312/9.48 |
| 5,097,946 | 3/1992 | Emrich ............................ 312/9.48 X |
| 5,111,939 | 5/1992 | Schafer . |
| 5,154,294 | 10/1992 | Dunford . |
| 5,191,977 | 3/1993 | Markovitz ......................... 312/9.48 X |
| 5,226,704 | 7/1993 | Porter ............................... 312/9.48 |
| 5,320,244 | 6/1994 | Yu ................................. 206/309 X |
| 5,360,107 | 11/1994 | Chasin et al. ................... 312/9.48 X |
| 5,366,073 | 11/1994 | Turrentine et al. ............... 206/308.1 |
| 5,385,398 | 1/1995 | Huys ............................... 312/9.48 |
| 5,393,135 | 2/1995 | Tisbo et al. ..................... 312/9.48 |
| 5,515,979 | 5/1996 | Salvail ........................... 312/9.48 X |

FOREIGN PATENT DOCUMENTS

| | | | |
|---|---|---|---|
| 2059376 | 7/1992 | Canada ........................... 206/308.1 |
| 490671 | 6/1992 | European Pat. Off. ............ 206/308.1 |

*Primary Examiner*—Peter M. Cuomo
*Assistant Examiner*—James O. Hansen
*Attorney, Agent, or Firm*—Fish & Richardson P.C.

[57] ABSTRACT

A storage and dispensing unit for a plurality of compact disks in their disk cases in the opened position, the unit including two side wall is that are connected to each other and spaced from each other by a distance greater than the case width, and a plurality of pairs of opposed rails extending toward each other from the side walls so that the inner edges of the rails are spaced from each other by less than the case width, the rails being spaced from adjacent rails on the side wall by a distance greater than the maximum case thickness, the side walls having a length of at least about twice the case width so that a case can be contained within the unit on a respective pair of rails with the case opened, and the base of the case can be extracted by sliding on the opposed rails to move the case to a disk extraction position in which the case base extends beyond the side walls and the disk is exposed to permit extraction of the disk from the case.

15 Claims, 5 Drawing Sheets

UNIT FOR STORING AND DISPENSING DISKS

BACKGROUND OF THE INVENTION

The invention relates to a unit for storing media storage disk cases and dispensing restoring media storage disks, such as audio compact disks, audio mini disks, or CD ROM disks.

Disks are traditionally enclosed in clear Lucite boxes called "jewel cases" which are typically stored on shelves, in boxes, or in specially designed storage containers. The jewel case takes two hands to open, is difficult to open even with two hands, and breaks easily. U.S. Pat. No. 4,189,808 discloses a mechanism which stores the jewel case in the closed position, and mechanically opens the jewel case upon extraction from storage using arms and hinges.

U.S. Pat. Nos. 4,702,369, 5,360,107 and 5,366,073 describe arrangements in which disks are stored in drawers.

SUMMARY OF THE INVENTION

The invention features, in general, a storage and dispensing unit for a plurality of cases holding media storage disks, e.g., compact disks. The cases have a generally square base, a generally square cover connected to the base at a hinge, a case width, and a maximum case thickness when opened. The unit has two side walls that are connected to each other and spaced from each other by a distance greater than the case width. The unit also has a plurality of pairs of opposed rails extending toward each other from the side walls so that the inner edges of the rails are spaced from each other by less than the case width. The rails are spaced from adjacent rails on the side wall by a distance greater than the maximum case thickness, and the side walls have a length of at least about one and one-half times the case width. The cases are contained within the unit on a respective pair of rails with the case opened, and the base of the case can be extracted by sliding on the opposed rails to move the case to a disk extraction position in which the case base extends beyond the side walls and the disk is exposed to permit extraction of the disk from the case. The case thus acts as a drawer for the disk, permits the original cases and disks to be associated together as a unit, and does not require the user to open the case to access the disk.

In preferred embodiments the opposed rails have an associated stop for engaging a unique feature on the case to prevent removal of the case beyond the disk extraction position. The thickest portion of the base and cover of the case when opened is at or near the hinge, and the stop is a protruding structure (e.g., a bump) near the front of the rail that prevents movement of the thickest portion past it without deforming the rail or the case. The protruding structure has inclined surfaces on its front and back, and the rails are sufficiently flexible to permit the thickest portion to move past the protruding structure without damage to the case or unit upon application of an insertion removal force, but the structure prevents removal of the case with the application of a force that is less than the insertion force.

Preferably the side walls have a length greater than about 1.8 times the width (greater than about 2.0 times the width for cases that are longer than they are wide). The length of the opened case is at least twice the width and sometimes is slightly longer. In the storage and dispensing unit, it is desirable for the stored, opened cases to extend beyond the side walls and rails a distance sufficient to facilitate grasping of the end of the case with fingers. The unit could have a wider extension at the front or a specially designed cover that provides easy access to the ends of the cases but also causes the stored cases to be enclosed.

The unit preferably has bottom and top walls connected between the side walls, and a back wall connected between the side walls and between the bottom and top walls. The unit also preferably has a cover that is movable from a closed position in which the cover covers the front of the region between the side walls and prevents moving the cases to an extraction position in which the disks can be extracted. The cover is located between the side walls when it is in the open position.

When used to store compact disks, having a diameter of about 4¾ inches, the case width is about 4⅞ inches, and the maximum case thickness is about ⅝ inch. The side walls of the unit are spaced from each other by greater than 4⅞ inches, the inner edges of the opposed rails are spaced from each other by less than 4⅞ inches, and the side walls are about 9¾ inches in length (the opened case is about 10⅝ inches in length, as the case is slightly longer than it is wide). The rails are spaced from each other by a distance greater than about ⅝ inch, and the protruding structure is spaced from an opposed rail surface by less than about ⅝ inch.

Units according to the invention could also be used for other media storage disks having similar case constructions but different standard disk diameters and different case dimensions. The case width in general would be between 100% and 110% of the standard disk diameter, and the maximum case thickness would be between 300% and 600% of the disk thickness.

Embodiments of the invention have one or more of the following advantages. The disk storage and dispensing unit provides a one-hand operation. The disk can be stored with its individual case and information book as an integrated unit so that the information book, jewel case, and compact disk are stored as one just as they are sold as one. There is no unnecessary handling of the jewel case so it will be less prone to breakage. The storage container has minimal mechanical complexity. The compact disks and jewel cases are protected from environmental harm such as spilled beverages, dust, and the like. The Jewel case thus is unlikely to be damaged, since it is less often removed and handled, or broken by either impact from dropping, or improper opening. The cover is hinged at the top or bottom and folds down to seal the unit, and folds up and slides into the top of the device when the user wishes to extract disks.

Other advantages and features of the invention will be apparent from the following description of the preferred embodiment thereof and from the claims.

DESCRIPTION OF THE PREFERRED EMBODIMENT

Figure 1:
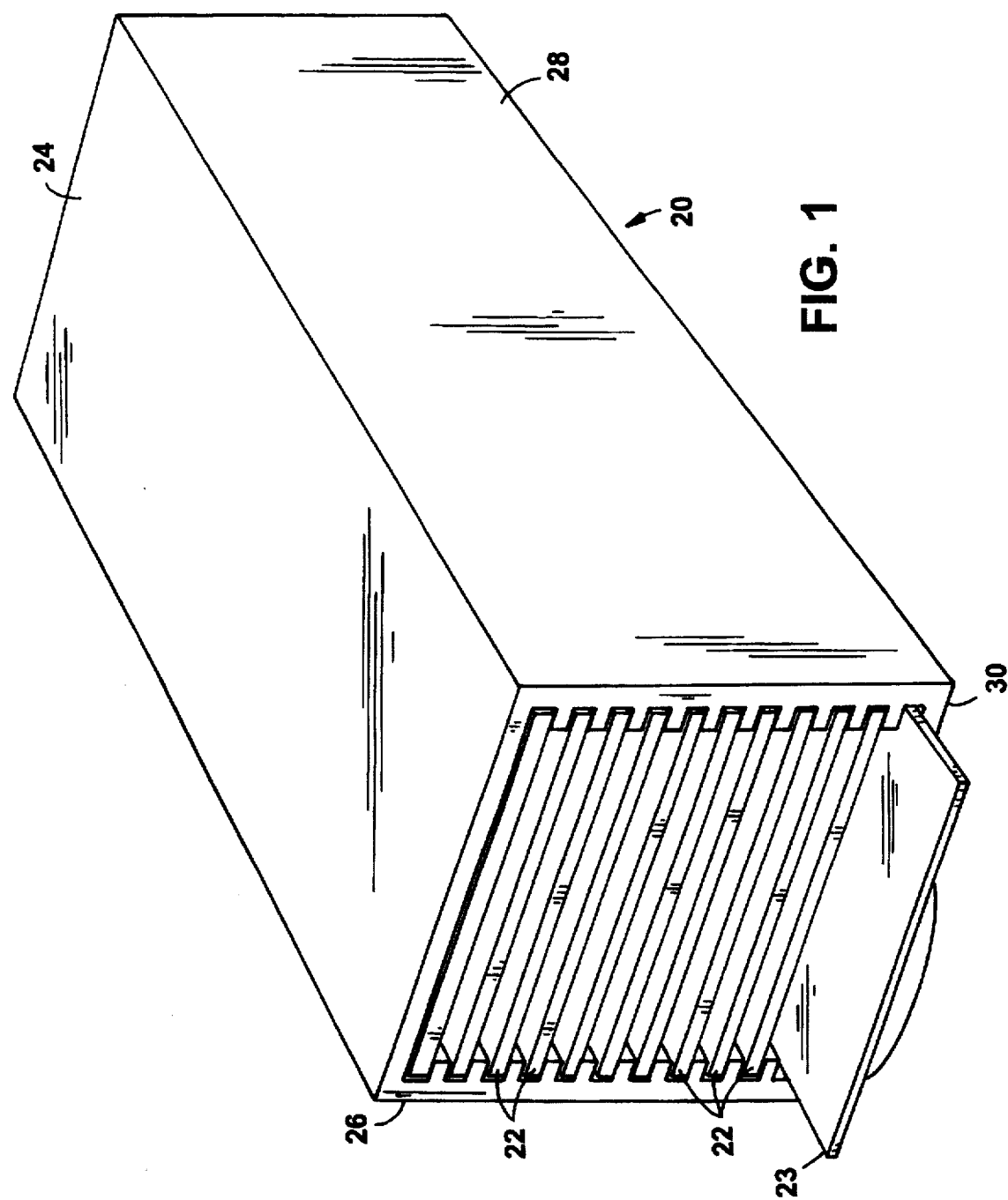
FIG. 1 is a perspective view of a disk storage and dispensing unit according to the invention.
Figure 2:
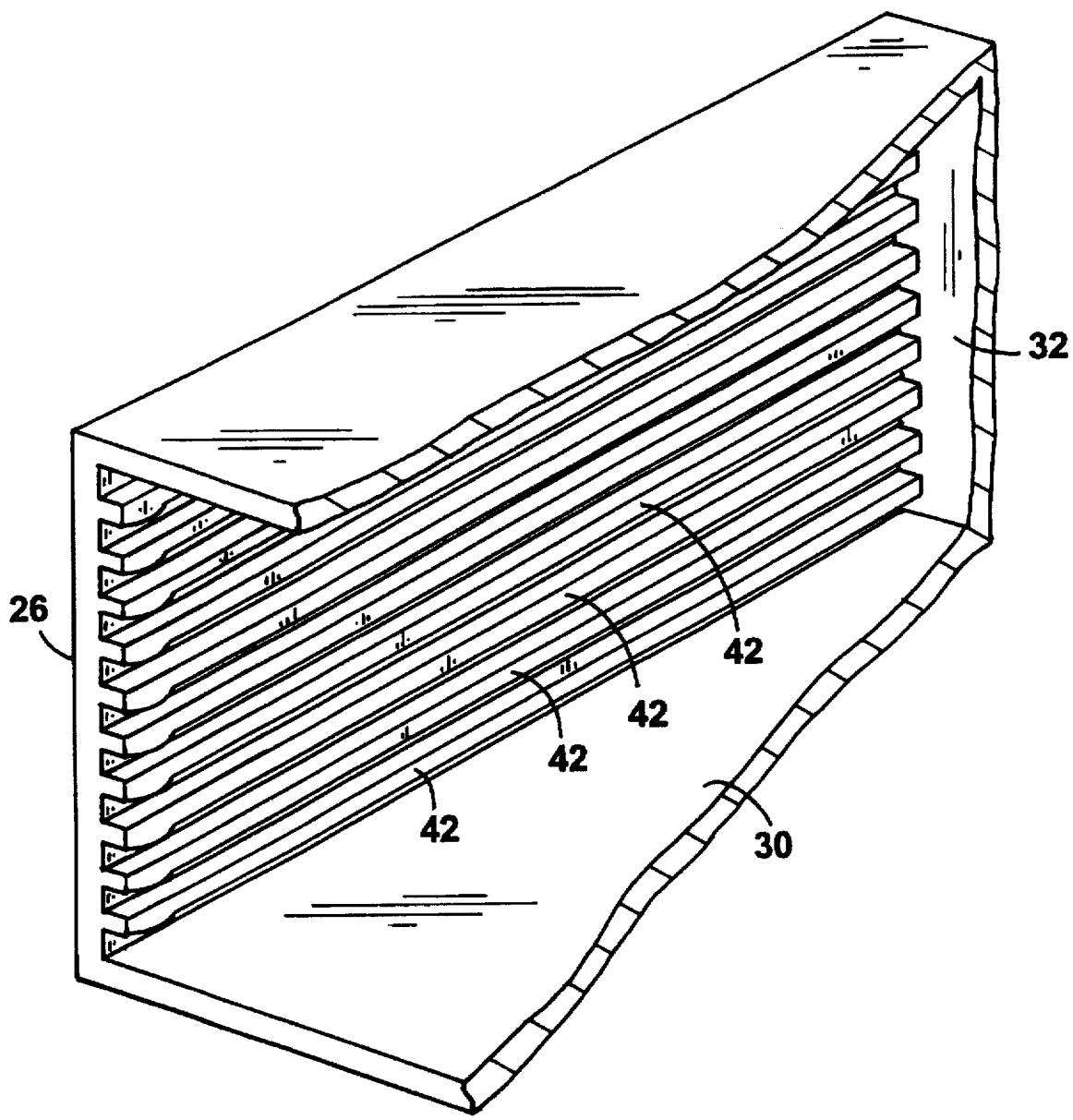
FIG. 2 is a perspective view, partially broken away, showing one of the opposing vertical sides of the FIG. 1 unit.

FIGS. 1 and 2 show storage and dispensing unit 20 for storing open jewel cases 22. Unit 20 is a five-sided unit including a top 24, left-side 26, right-side 28, bottom 30, back 32, and cover 34. The top 24 is one piece of rigid rectangular material, e.g., plastic made by injection molding. The bottom 30 is one piece of rigid rectangular material, e.g., plastic made by injection molding, and is identical to the top. The size of the top and bottom is slightly larger than the size of the open jewel case for which the device was designed, so as to stow the jewel cases 22 completely in unit 20. The back 32 is one piece of rigid rectangular material, e.g., plastic made by injection molding; its size is determined by the number and the height and width of the jewel case or cases to be stored by unit 20. Cover 23 is shown at the bottom of unit 20.

FIG. 2 shows the left side 26 which supports parallel rails 42 which protrude perpendicularly from the side, run parallel to each other along the length of the side, and are distributed regularly along the side. Each rail is spaced parallel to the next rail so that the side of the jewel case 22 shown in FIG. 4 fits easily in the passage created by the two parallel rails 42. The rails on both the left and right side are identically arranged, so that when the sides face each other the opposing rails on the left and right side can support a jewel case 22 which spans the space between the rails. The rails protrude sufficiently to assure that the jewel case will span the space between its two supporting rails. The rails determine the number of jewel cases storable, with cover 23 at the bottom, as shown in FIG. 1, the number of disks is equal to the number of rails on one side.

Figure 4:
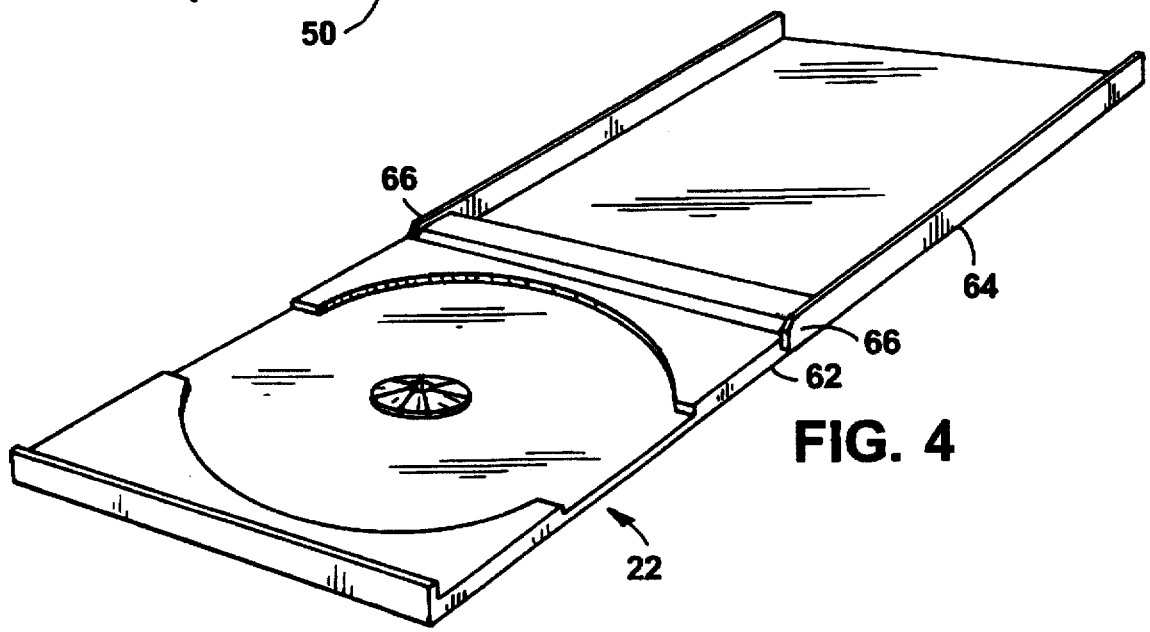
FIG. 4 is a perspective view of a typical jewel box in the open position.

FIG. 4 shows open jewel case 22. The assumed design of the jewel case 22 used with compact disks (which have a diameter of about 4¾ inches) is well known. It has a base 62 which holds a media storage disk and has a cover 64 which is connected to the base at a hinge 66. When the cover 64 is open and rests on the same plane as the base, hinge 66 is the thickest part, viewed from the side, of the jewel case 22. The case width is about 4⅞ inches, and the maximum case thickness is about ⅜ inch. The side walls 26, 28 of the unit 20 are spaced from each other by greater than 4⅞ inches, the inner edges of the opposed rails 42 are spaced from each other by less than 4⅞ inches, and the side walls 26, 28 are at least 9¾ inches in length (i.e., at least twice the width, and preferably at least 10⅝ inches in length, as the case 22 is slightly longer than it is wide). The unit 20 is thus deep enough to enable complete insertion of the open jewel case 22.

Figure 3:
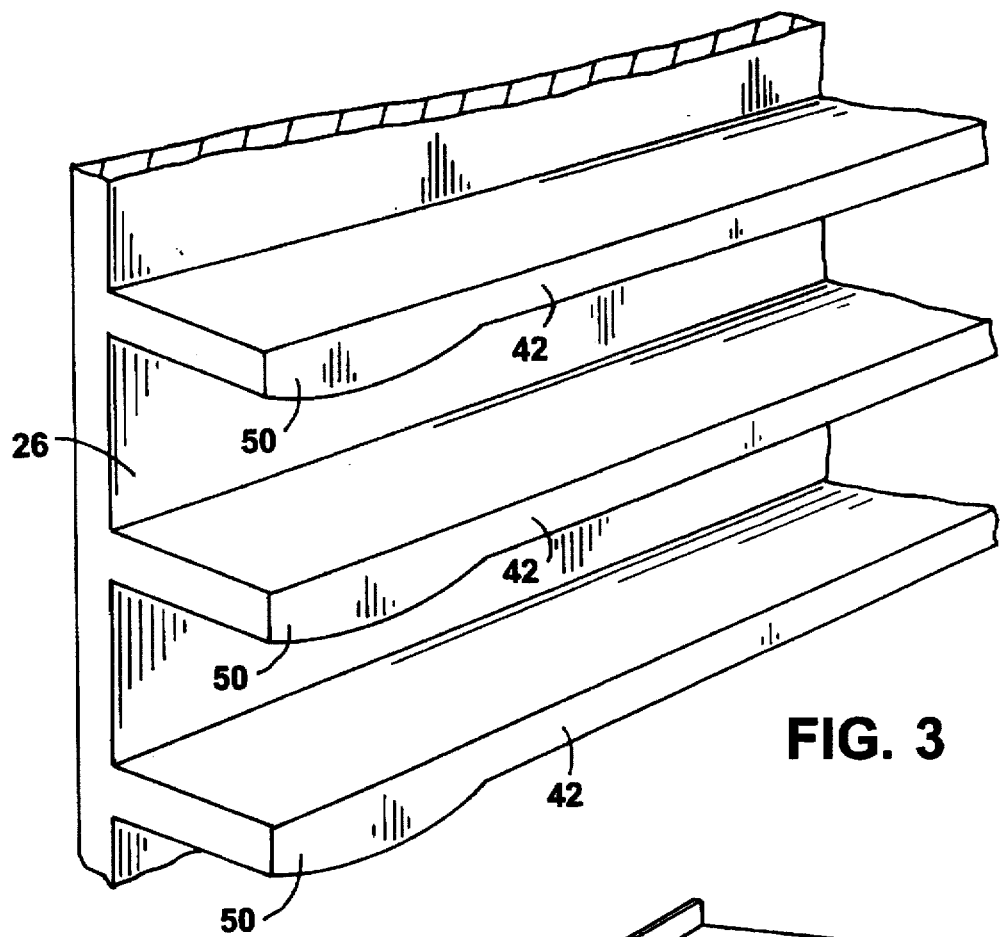
FIG. 3 is a close up perspective view of a bump on a rail of the FIG. 1 unit.

FIG. 3 shows the bump 50 which protrudes from the top or bottom of each rail 42. The jewel case 22 slides easily between the rail 42 and the bump 50 above a rail 42 except at the hinge 66. At the hinge 66, the base is thickest, and the hinge 66 becomes wedged between the rail and the bump as the jewel case 22 slides between the rails 42. The rails are spaced from each other by a distance greater than about ⅜ inch, and the protruding bump structure is spaced from an opposed rail surface by less than about ⅜ inch. Bump 50 thus acts as a stop, preventing removal of a case 22 beyond a disk extraction position, unless a sufficient force is exerted to remove the case 22. Bump 50 has gently inclined surfaces on its front and back, and the rails are sufficiently flexible to permit the thickest portion of the opened case to move past bump 50 without damage to the case 22 or unit 20 upon application of an insertion removal force.

Figure 5:
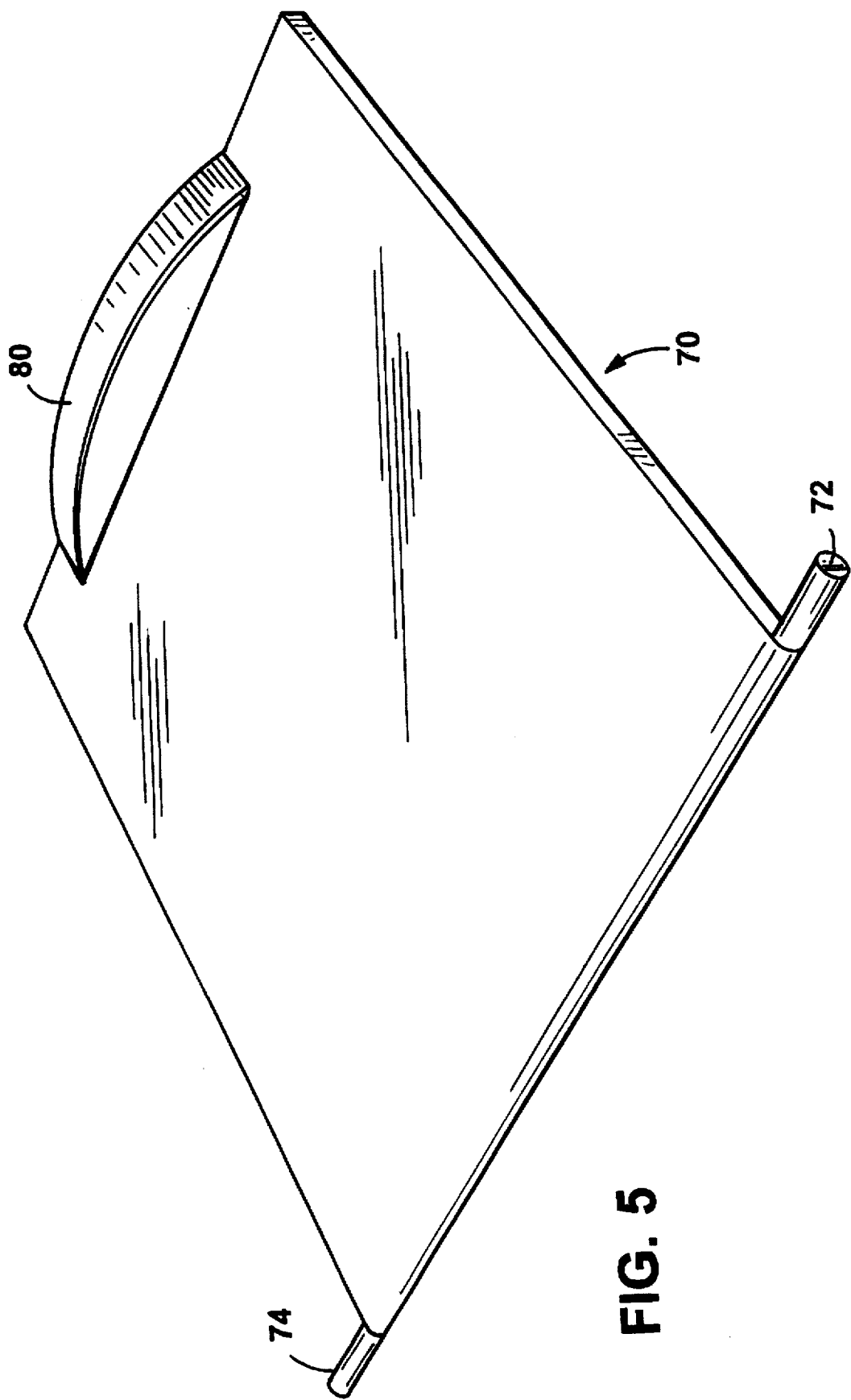
FIG. 5 is a perspective view of the cover of the FIG. 1 unit.

FIG. 5 shows a cover 70 for the unit 20 which protects jewel cases 22 from ordinary household environmental hazards such as dust or liquid spills. The cover 70 is one piece of rigid rectangular material with two small protrusions 72 and 74 which are received in tracks (not shown) that are located at the bottom of unit 20, and a handle 80 which assists manipulating the cover on its hinge. The cover 70 is, e.g., plastic made by injection molding. When in a closed position, cover 70 covers the opening to the region between the side walls. When in an open position, cover 70 is between the sidewalls at the bottom of unit 20. Cover 70 can also be located at the top of unit 20.

Figure 6:
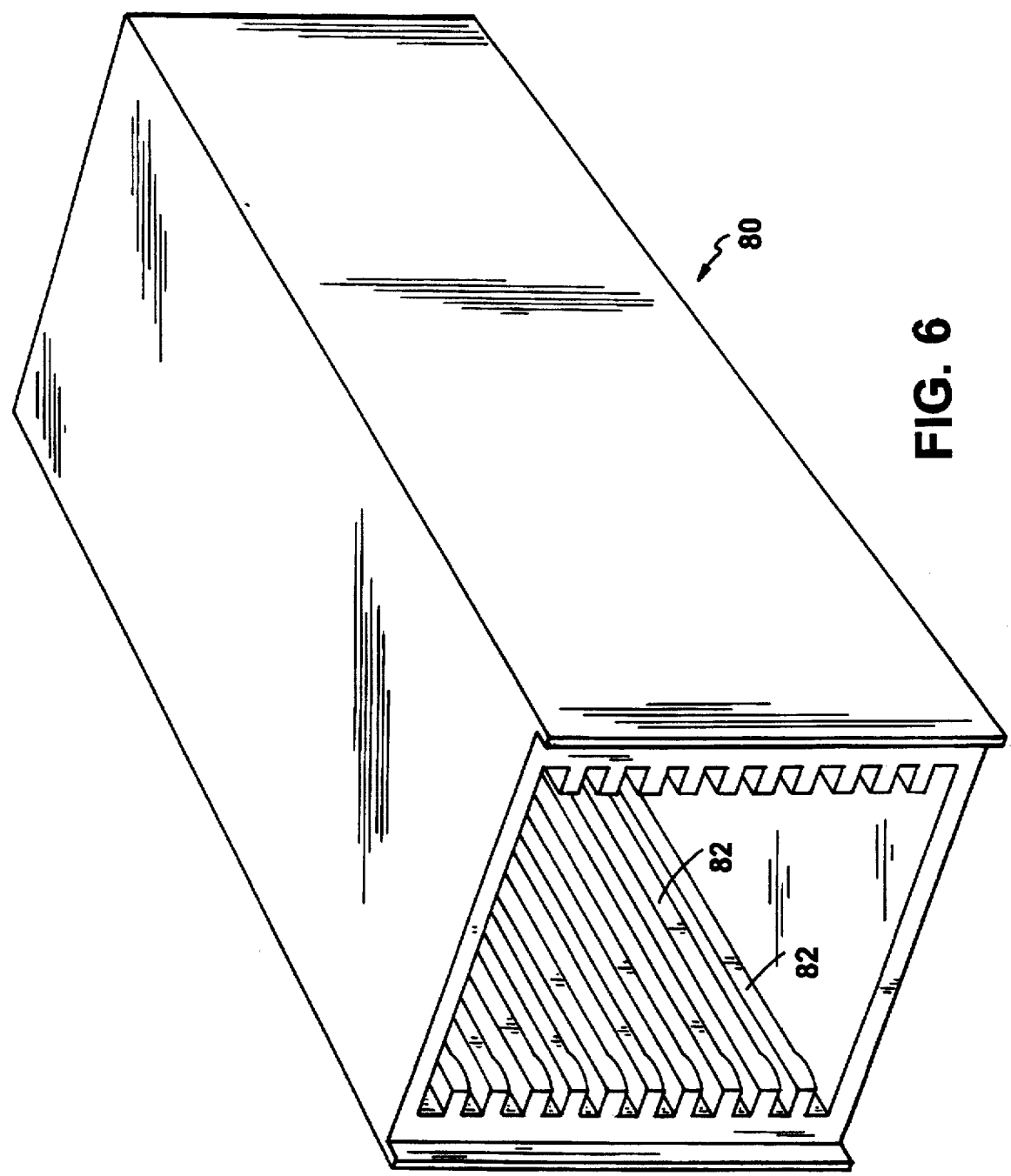
FIG. 6. is a perspective view of a disk storage and dispensing unit that has been modified to provide easy access to the stored disks.

FIG. 6 shows storage and dispensing unit 80, which has been modified by providing a wider extension at the front. In unit 80, the disk cases extend in front of rails 82 slightly, e.g., about 0.5 inch, to facilitate grasping by a user's fingers. The side walls and rails 82 can thus be made shorter than twice the width, probably about 0.2 times the width shorter, though in perhaps an extreme case about 0.5 times the width shorter. Unit 80 would be used with a cover that encloses the exposed ends of the cases.

The invention is not restricted to the above described embodiments which can be varied in a number of ways within the scope of the invention. It is, for instance, possible to wedge the jewel case on a number of other locations of discontinuity along the length of the side of the open jewel case. Also, the back could be opened to permit insertion of the cases 22 from the back; in this configuration, one could use stops that prevented complete removal of cases 22 from the front.

What is claimed is:

1. The combination comprising:
   a storage and dispensing unit, and
   a plurality of cases holding media storage disks stored within said storage and dispensing unit,
   each said case having a generally square base, a generally square cover connected to said base at a hinge, a case width, and a maximum case thickness when opened, said cases being stored in said unit in case open positions in which said base and cover lie in a linear side by side fashion,
   said unit comprising
   two side walls that are connected to each other and spaced from each other by a distance greater than said case width, and
   a plurality of pairs of opposed rails extending toward each other from said side walls, said opposed rails having inner edges, said inner edges of said opposed rails being spaced from each other by less than said case width, said rails being spaced from adjacent rails on said side wall by a distance greater than said maximum case thickness, said side walls having a length proportional to said length of an opened case,
   said open cases being contained within said unit on respective said pairs of opposed rails,
   whereby said base of said case can be extracted by sliding on said opposed rails to move said case to a disk extraction position in which said case base extends beyond said side walls and a said disk is exposed to permit extraction of said disk from said case.

2. The unit of claim 1 wherein said side rails are less than about three times said case width.

3. The unit of to claim 1 wherein said opposed rails have an associated stop for engaging a unique feature on a said case to prevent removal of said case beyond said disk extraction position.

4. The unit of claim 3 wherein said base and said cover have a thickest portion, and wherein said thickest portion of said base and cover of said case when opened is at or near said hinge, and wherein said rails each have a front, and wherein said stop is a protruding structure near the front of the rail that prevents movement of said thickest portion past it without deforming a said rail or said case.

5. The unit of claim 4 wherein said disks are compact disks having a diameter of about 4¾ inches, said case width is about 4⅞ inches, wherein said side walls are spaced from each other by greater than 4⅞ inches, wherein the inner edges of said opposed rails are spaced from each other by less than 4 ⅞ inches, wherein said side walls are at least 9¾ inches in length, wherein said thickest portion of said case is about ⅜ inch, wherein said rails are spaced from each other by a distance greater than about ⅜ inch, and wherein said protruding structure is spaced from an opposed rail surface by less than about ⅛ inch.

6. The unit of claim 4 wherein said protruding structure has inclined surfaces on its front and back and said rails are sufficiently flexible to permit said thickest portion to move past said protruding structure without damage to said case or unit upon application of an insertion/removal force but said structure prevents removal of said case with the application of a force that is less than said insertion force.

7. The unit of claim 1 wherein said disks are compact disks having a diameter of about 4¾ inches, said case width is about 4⅞ inches, said side walls are spaced from each other by greater than 4⅞ inches, the inner edges of said opposed rails are spaced from each other by less than 4⅞ inches, and said side walls are at least 9¾ inches in length.

8. The unit of claim 7 wherein said side walls are at least 10⅝ inches in length.

9. The unit of claim 1 further comprising bottom and top walls connected between said side walls.

10. The unit of claim 9 further comprising a back wall connected between said side walls and between said bottom and top walls.

11. The unit of claim 10 wherein said unit has a region between said side walls and wherein said region between said side walls has a front, further comprising a cover that is movable from a closed position in which said cover covers the front of the region between said side walls and prevents extraction of said cases to an open position in which said cases can be extracted.

12. The unit of claim 11 wherein said cover is located between said side walls when it is in said open position.

13. The unit of claim 1 wherein said disk is an audio compact disk, audio mini disk, or CD ROM disk having a standard diameter and standard thickness, and said case width is between 100% and 110% of said standard diameter, and said maximum case thickness is between 300% and 600% of said thickness.

14. The unit of claim 1 wherein said side rails are greater than about 1.8 times said case width.

15. The unit of claim 1 wherein said side rails are greater than about twice said case width.

* * * * *